United States Patent
Barcin

(10) Patent No.: US 8,667,862 B2
(45) Date of Patent: Mar. 11, 2014

(54) OPERATING MECHANISM FOR A PARKING BRAKE

(75) Inventor: Baris Barcin, Leinfelden-Echterdingen (DE)

(73) Assignee: Dietz-automotive GmbH & Co. KG, Dettingen/Teck (DE)

( * ) Notice: Subject to any disclaimer, the term of this patent is extended or adjusted under 35 U.S.C. 154(b) by 381 days.

(21) Appl. No.: 12/824,887

(22) Filed: Jun. 28, 2010

(65) Prior Publication Data
US 2010/0326228 A1 Dec. 30, 2010

(30) Foreign Application Priority Data
Jun. 26, 2009 (DE) .................... 20 2009 008 792 U

(51) Int. Cl.
*B60T 7/10* (2006.01)

(52) U.S. Cl.
USPC .............................................. 74/535; 74/537

(58) Field of Classification Search
USPC ................. 74/523, 525, 535–538, 575, 577 S
IPC ......................................................... B60T 7/10
See application file for complete search history.

(56) References Cited

U.S. PATENT DOCUMENTS

| | | | |
|---|---|---|---|
| 935,581 A | 9/1909 | Bowman | |
| 2,168,567 A | 8/1939 | Gould | |
| 2,808,734 A | 10/1957 | Ortner | |
| 3,109,320 A * | 11/1963 | Krautwurst | 74/529 |
| 3,310,995 A | 3/1967 | Buchwald | |
| 3,580,104 A | 5/1971 | Yashiro et al. | |
| 3,901,100 A | 8/1975 | Iida et al. | |
| 4,212,211 A | 7/1980 | Rickert | |
| 4,280,741 A | 7/1981 | Stoll | |
| 4,311,060 A | 1/1982 | Kawaguchi et al. | |
| 4,403,524 A | 9/1983 | Gurney | |
| 4,515,036 A | 5/1985 | Dotson | |
| 5,247,850 A * | 9/1993 | Lenzke | 74/523 |

(Continued)

FOREIGN PATENT DOCUMENTS

| | | |
|---|---|---|
| DE | 3103658 A1 | 9/1982 |
| DE | 3709418 A1 | 9/1988 |

(Continued)

OTHER PUBLICATIONS

German Office Action issued in related German Application No. DE 10 2009 022 656.7 dated Feb. 22, 2010, plus English Translation.

(Continued)

*Primary Examiner* — Thomas Diaz
(74) *Attorney, Agent, or Firm* — Venable LLP; Robert Kinberg; Steven J. Schwarz

(57) ABSTRACT

An operating mechanism for a parking brake includes a manual brake lever pivotably coupled to a bearing block and a locking device adapted to lock the manual brake lever into a position. The locking device includes a detent arranged on the manual brake lever and adapted to pivot around a pivoting axis, the detent having a bore, a locking segment connected to the bearing block, a spring element adapted to hold the detent into a locking position on the locking segment, and a connecting element adapted to secure the detent on the manual brake lever. The connecting element and the spring element jointly form a single structural unit adapted for insertion into the bore in the detent during installation of the detent on the manual brake lever.

4 Claims, 2 Drawing Sheets

(56) References Cited

U.S. PATENT DOCUMENTS

| | | | |
|---|---|---|---|
| 5,272,935 A * | 12/1993 | Heinemann et al. | 74/523 |
| 5,448,928 A | 9/1995 | Harger | |
| 5,560,082 A | 10/1996 | Vetter | |
| 5,645,155 A | 7/1997 | Houghton | |
| 5,699,698 A | 12/1997 | Geyer | |
| 5,735,178 A * | 4/1998 | Barbunopulos | 74/535 |
| 5,907,977 A | 6/1999 | Huebner et al. | |
| 5,950,496 A | 9/1999 | Rampp | |
| 5,992,264 A | 11/1999 | Brock, Sr. | |
| 6,016,718 A | 1/2000 | Park et al. | |
| 6,286,389 B1 | 9/2001 | Papadatos | |
| 6,837,127 B2 | 1/2005 | Schumacher | |
| 6,915,719 B2 | 7/2005 | Joo | |
| 6,973,852 B2 | 12/2005 | Shin et al. | |
| 7,140,476 B2 | 11/2006 | Hilss et al. | |
| 7,152,508 B2 | 12/2006 | McCalley, Jr. et al. | |
| 7,475,615 B2 | 1/2009 | Revelis | |
| 7,526,981 B2 | 5/2009 | Ferenc | |
| 7,779,723 B2 * | 8/2010 | Kim | 74/535 |
| 8,230,757 B2 | 7/2012 | Nocko et al. | |
| 2003/0177856 A1 | 9/2003 | Reese et al. | |
| 2006/0175157 A1 | 8/2006 | Villa et al. | |
| 2007/0175291 A1 * | 8/2007 | Kim | 74/528 |
| 2010/0005922 A1 | 1/2010 | Holland et al. | |
| 2010/0294075 A1 | 11/2010 | Barcin | |
| 2010/0300241 A1 | 12/2010 | Barcin | |

FOREIGN PATENT DOCUMENTS

| | | | |
|---|---|---|---|
| DE | 3820978 | 12/1989 | |
| DE | 195-21-159 A1 | 12/1996 | |
| DE | 196-40-720 A1 | 9/1997 | |
| DE | 19954813 A1 | 5/2001 | |
| DE | 100-06-827 A1 | 9/2001 | |
| DE | 10-2005-057-037 A1 | 6/2007 | |
| EP | 476208 A1 | 3/1992 | |
| EP | 790165 A1 | 8/1997 | |
| EP | 1127760 A2 | 8/2001 | |
| EP | 1273495 A2 * | 1/2003 | B60T 7/10 |

OTHER PUBLICATIONS

German Office Action issued in related German Application No. 10 2009 022 461.0-2 Apr. 6, 2010, plus English Translation.

German Office Action issued in related German Application No. 10 2009 022 460.2 dated Feb. 22, 2010, plus English Translation.

* cited by examiner

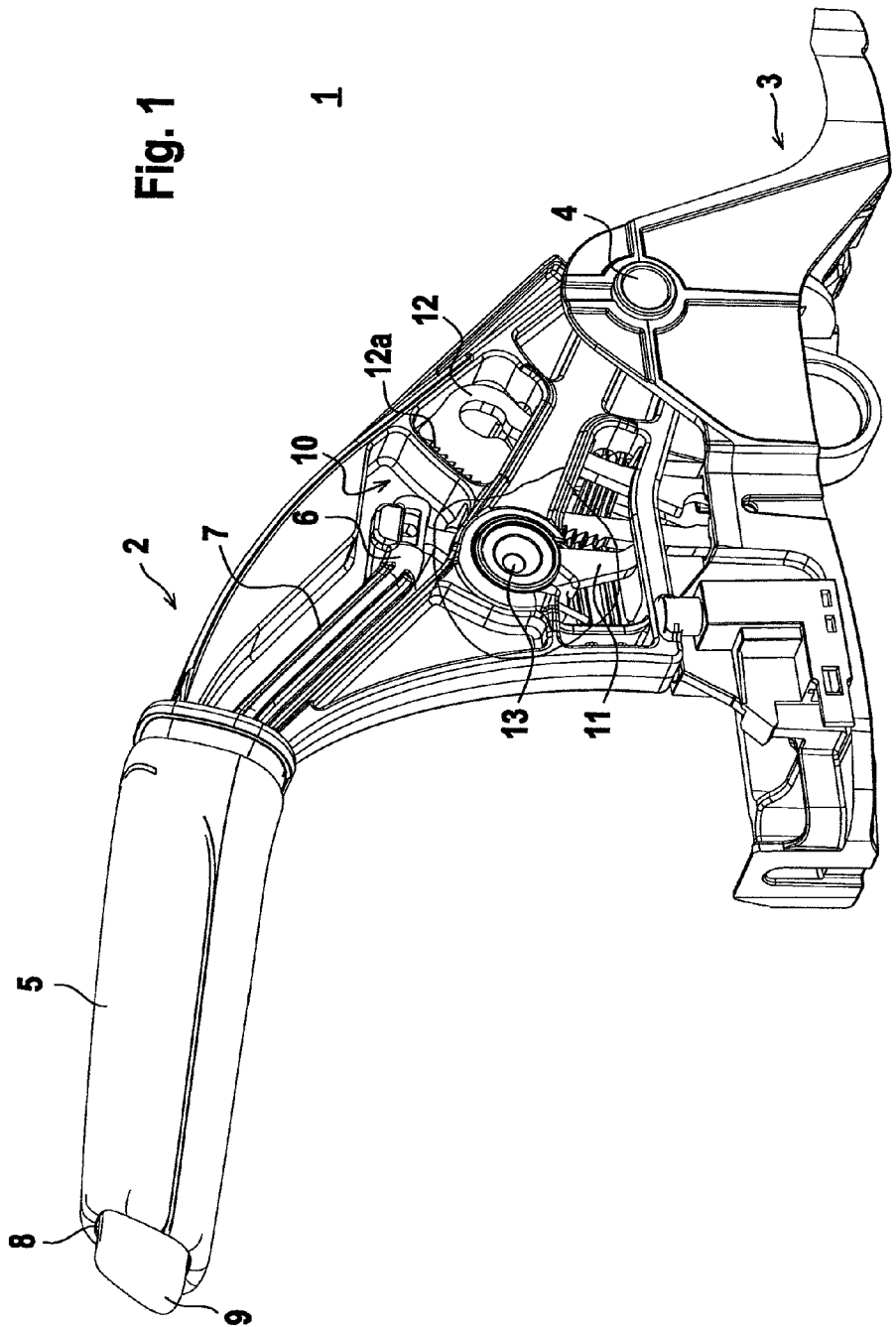

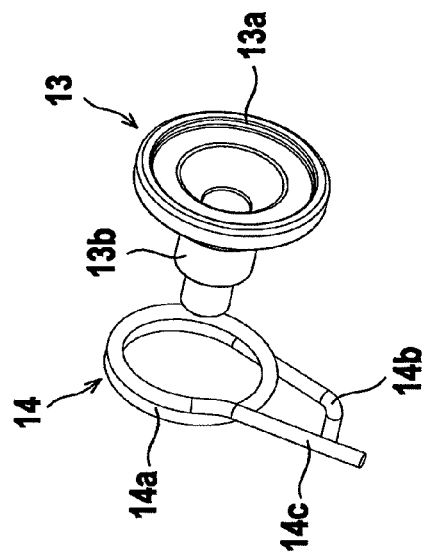
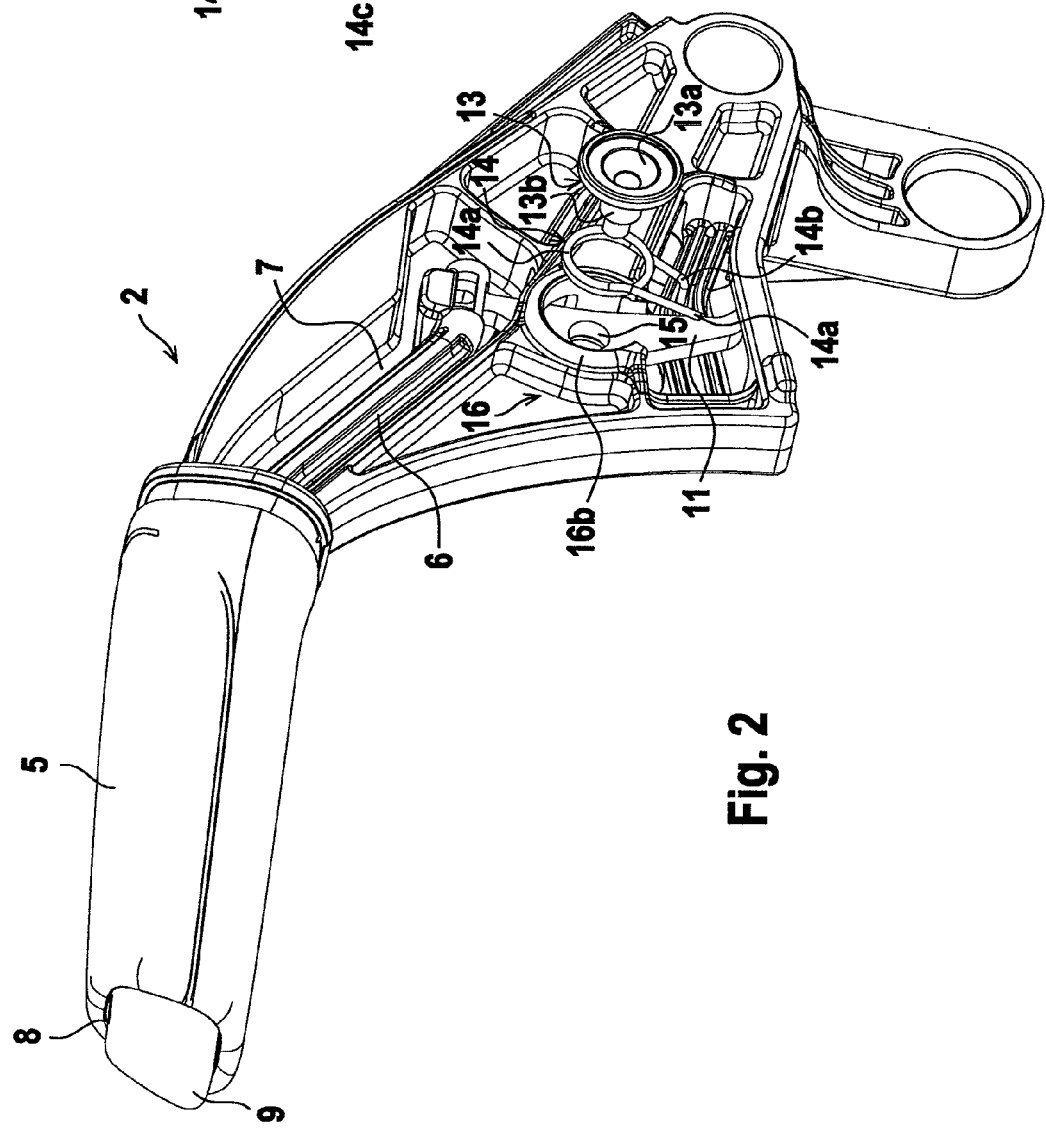

OPERATING MECHANISM FOR A PARKING BRAKE

CROSS-REFERENCE TO RELATED APPLICATION

This application claims priority under 35 U.S.C. §119 to German Patent Application No. 20 2009 008 792.1, filed in Germany on Jun. 26, 2009, the entire subject matter of which is expressly incorporated herein by reference.

BACKGROUND OF THE INVENTION

The invention relates to an operating mechanism for a parking brake.

An operating mechanism for a parking brake is known from German Document DE 195 21 159 C2. This operating mechanism comprises a manual brake lever which is positioned so as to pivot on a bearing block. A single activation rod is provided for operating the parking brake, wherein this activation rod engages in a locking device. The activation rod extends inside a tubular housing for the manual brake lever. A push button is provided on the front end of the activation rod which projects outside the tubular housing and can thus be operated by a user.

The locking device includes a locking segment and a detent. The locking segment is attached to the bearing block and comprises a strip with locking teeth. The detent is positioned so as to pivot on a bearing journal of the manual brake lever and is pre-tensioned via a spring element. For this, the detent is positioned in such a way on the bearing journal that it is divided into two pivoting arms, with one arm extending on each side of the bearing journal. Detent noses are provided at one end of the first pivoting arm, and latch into the locking teeth on the locking segment in order to fixate the detent on the locking segment. The end of the second pivoting arm is attached via a hinged connection to the lower end of the activation rod.

The operating mechanism functions such that a pivoting movement of the manual brake lever is transmitted to a traction means, such as a pull rod. The manual brake lever is secured with the aid of the locking device in a desired end position on the bearing block by allowing the detent to engage in the pin segment and is kept in said position by the force of the spring element.

With known operating mechanisms, the installation of the locking device is relatively time-consuming. Attaching the spring element, in particular, may be very involved since it must be inserted on the side, between segments of the manual brake lever, for the installation on the manual brake lever and must be fixated on or in the region of the detent. Since the installation of the spring element must be realized with a fully-installed manual brake lever and thereon positioned detent, typically very little clearance space is available for inserting the spring element, which further complicates the installation.

SUMMARY OF THE INVENTION

It is an object of the present invention to reduce the installation expenditure for an operating mechanism of the aforementioned type.

According to an embodiment, this object can be solved with an operating mechanism for a parking brake, comprising: a manual brake lever pivotably coupled to a bearing block; and a locking device adapted to lock the manual brake lever into a position, wherein the locking device includes: a detent arranged on the manual brake lever and adapted to pivot around a pivoting axis, the detent having a bore, a locking segment connected to the bearing block, a spring element adapted to hold the detent into a locking position on the locking segment, and a connecting element adapted to secure the detent on the manual brake lever, wherein the connecting element and the spring element jointly form a single structural unit adapted for insertion into the bore in the detent during installation of the detent on the manual brake lever.

According to an embodiment of the invention, the operating mechanism for a parking brake comprises a manual brake lever, positioned so as to pivot on a bearing block, as well as a locking device for locking in place the manual brake lever in a latched-in position. The locking device is provided with a detent, arranged on the manual brake lever so as to pivot around a pivoting axis, and a pin segment that is fixedly connected to the bearing block. The detent is locked into a position on the pin segment and is held in this position with the aid of the spring force. The detent is secured on the manual brake lever with the aid of a connecting element. During the installation of the detent on the manual brake lever, the connecting element which forms a single structural unit together with the spring element can be inserted into a bore in the detent.

An advantage of the operating mechanism according to the invention is that two separate operational steps are no longer required for the assembly of the locking device, the fixation of the detent and the installation of the spring element on the manual brake lever. Rather, owing to the fact that the connecting element and the spring element form a single structural unit, the detent and simultaneously also the spring element can be installed during a single operational step on the manual brake lever, thereby resulting in a considerable savings in time during the assembly of the manual brake lever.

It is furthermore advantageous that the structural unit, including a connecting element and spring element, can be produced easily and quickly, preferably by simply and easily fitting the spring element onto the connecting element. Since the structural unit can be assembled outside of the manual brake lever, essentially no restrictions exist which are caused by the manual brake lever design. It is particularly advantageous that no adjustment of the spring element relative to the connecting element is necessary to form the structural unit.

The detent can be installed by inserting it into a receptacle for the manual brake lever in such a way that a segment on one front of the detent, meaning where the bore exits, is exposed and that in this installed position of the detent, the connecting element can be inserted together with the spring element into this bore.

The assembly of the detent and the attaching of the spring element on the detent are thus made even easier since the access to the bore is not blocked by additional parts of the manual brake lever.

Once the connecting element is inserted into the bore, it must only be attached to the manual brake lever, wherein this can advantageously be achieved through radial riveting of the connecting element.

The connecting element assembled in this way forms an axial element, relative to which the detent can be pivoted.

The connecting element can be provided for this purpose with a circular-disc shaped head portion with an adjoining pin segment. The pin segment of the connecting element may be provided with a cylindrical section for which the outside diameter is adapted to the inside diameter of the bore.

It may be particularly advantageous if the receptacle on the manual brake lever for the detent has an edge segment extending along a circular section, wherein the inside diameter of the edge segment is adapted to the outside diameter of the head portion for the connecting element. Once the connecting element is attached to the detent, its head portion is positioned in the edge segment of the receptacle.

It is thus possible to obtain a pivot bearing for the detent in a simple manner, wherein this type of design furthermore permits an installation of the pivot bearing which can be realized even with untrained personnel.

According to an embodiment, the spring element is preferably a torsion spring. The torsion spring can consist of a ring-shaped basic body which is adjoined by two legs.

The design of the spring element can thus be optimally adapted to the design of the connecting element.

BRIEF DESCRIPTION OF THE DRAWINGS

These and other features and advantages of the invention will be further understood from the following detailed description of the preferred embodiments with reference to the accompanying drawings, showing in:

FIG. 1: An exemplary embodiment of the operating mechanism according to the invention for a parking brake, provided with a manual brake lever that is positioned pivoting on a bearing block;

FIG. 2: An individual representation of the manual brake lever for the operating mechanism, provided with components of a locking device;

FIG. 3: An individual representation of a connecting element and a spring element for the locking device according to FIG. 2.

DETAILED DESCRIPTION OF THE PREFERRED EMBODIMENTS

FIG. 1 shows an exemplary embodiment of an operating mechanism 1 for a parking brake in a vehicle.

The operating mechanism 1 comprises a manual brake lever 2 that can pivot around a horizontal axis on a bearing block 3, using a bearing journal 4. The manual brake lever 2 includes a basic body, having a front end that is embodied as a tubular housing. A handle 5 is positioned on this tubular housing.

The respective position of the manual brake lever 2 is transmitted via a sheathed cable, not shown herein, to the parking brake which is also not shown herein.

An activation rod 6, in the present case comprising an injection-molded plastic part, is positioned in the manual brake lever 2. The activation rod 6 is guided inside a cavity 7 of the manual brake lever 2. The activation rod 6 projects from the front end of the tubular housing. A push button 9 is mounted in this front end of the activation rod 6, in an opening 8 of the grip 5. The push button 9 can be depressed counter to a force which is exerted by restoring springs, not shown herein.

The activation rod 6 is connected to a locking device 10. With the aid of this locking device 10, the manual brake lever 2 can be locked-in at a predetermined pivoting position. The locking device 10 comprises a detent 11 and a locking segment 12. The locking segment 12 is fixedly connected to the bearing block 3 and comprises a strip with locking teeth 12a. The detent 11 is provided on its lower end with a detent nose which can engage in the locking teeth 12a of the locking segment 12. The upper end of the detent 11 is connected to the activation rod 6.

The detent 11 is positioned in such a way on the manual brake lever 2 that it can pivot around a pivoting axis. A spring force acts upon the detent 11 in the direction of the pin segment, so that once the detent 11 is locked into a position on the pin segment, this locked position is maintained.

The detent 11 is latched into such a locking position on the locking segment 12 in order to set the manual brake lever 2. By activating the push button 9, the detent 11 can be released from the locking segment 12 and the manual brake lever 2 can thus be pivoted. The pivoting movement of the manual brake lever 2 is transmitted to the therein positioned sheathed cable, thus activating the parking brake.

The component embodying the pivot bearing for the detent 11 and the component for generating the spring force exerted onto the detent 11 are shown in further detail in FIGS. 2 and 3. FIG. 2 shows the manual brake lever 2 for the operating mechanism 1 in a configuration where the pivot bearing and the component for generating the spring force are not yet installed on the manual brake lever 2. FIG. 3 shows individual representations of these components.

The component used for forming the pivot bearing for the detent 11 is a connecting element 13 which, as shown in FIGS. 2 and 3, can be radially-symmetric around an axis of symmetry.

The connecting element 13 includes an essentially circular-disc shaped head portion 13a and a pin segment 13b that adjoins the head portion 13a on the underside, extends along the axis of symmetry and is embodied integrally with the head portion 13a.

The pin segment 13b has a circular cross section. The portion of the pin segment 13b which directly adjoins the head portion 13a in this case has a larger diameter than the front section of the pin segment 13b.

The component for generating the spring force exerted onto the detent 11 may be a spring element and, in the present case, is embodied as a torsion spring 14. The torsion spring 14 includes a bent metal wire and has a ring-shaped basic body 14a from which two parallel legs 14b, 14c extend outward at a distance to each other, wherein the exposed end of one of the legs 14b is bent.

For the installation on the manual brake lever 2, the torsion spring 14 is initially fitted with the ring-shaped basic body 14a onto the pin segment 13b of the connecting element 13, so that the basic body 14a fits flush against the underside of the head portion 13a of the connecting element 13.

The structural unit or component formed in this way is subsequently installed in a single operational step on the detent 11 by inserting the pin segment 13b of the connecting element 13 into a central bore 15 in the detent 11.

FIG. 2 illustrates that the detent 11 is positioned inside a receptacle 16 on the manual brake lever 2, in such a way that the segment on the upper front of the detent 11 on which the bore 15 exits is exposed. The structural unit can thus be installed without problem on the detent 11 by inserting the pin segment 13b of the connecting element 13 from the top into the opening of the bore 15.

The outside diameter of the head portion 13a for the connecting element 13, which directly adjoins the pin segment 13b, is adapted to the inside diameter of the bore 15. As soon as the pin segment 13b of the connecting element 13 is inserted completely into the bore 15, the pin segment 13b that adjoins the head portion 13a fits with minimum play against the inside wall of the bore 15. The circular-disc shaped head portion 13a of the connecting element 13 simultaneously fits against the inside of an edge segment 16b that extends along a circular section of the receptacle 16. The inside diameter of the edge segment 16b in this case is adapted to the outside diameter of the head portion 13a, so that the head portion 13 comes to rest with slight play against the edge segment 16b of the receptacle 16.

Once the connecting element 13 with the pin segment 13b is inserted, the front edge of the pin segment 13b projects over the back side of the receptacle 16 and is secured in that location, for example, by radial riveting, meaning it is secured against being pulled from the bore 15. The detent 11, however, can still be pivoted relative to the connecting element 13 that forms an axis element.

Since the torsion spring 14 forms a single structural unit together with the connecting element 13 and the complete unit is installed on the detent 11 and the receptacle 16, the torsion spring 14 is already in the desired position in which the legs 14b, 14c of the torsion spring 14 encircle the detent 11 on the side, as shown in FIG. 1. No further operational steps are therefore required for installing the detent 11.

As a result of the specific shape of the torsion spring 14, a force can thus be generated with the torsion spring which presses the detent 11 against the pin segment 13b. With the locking device 10 embodied in this way, the detent 11 is held in a specific latched-in position on the pin segment 13b, thus securing the manual brake lever 2 in a specific pivoting position on the bearing block 3. The push button 9 can be depressed to release the lever from the locked position, thereby pulling the detent 11 counter to the spring force of the torsion spring 14 toward the back, so that the manual brake lever 2 can be pivoted to a new pivoting position.

It will be understood that the above description of the present invention is susceptible to various modifications, changes and adaptations, and that the same are intended to be comprehended within the meaning and range of equivalents of the appended claims.

The invention claimed is:

1. An operating mechanism for a parking brake, comprising:
   a manual brake lever pivotably coupled to a bearing block, wherein the manual brake lever defines a receptacle, and the receptacle defines a protruding circular edge segment;
   a locking device adapted to lock the manual brake lever into a position, wherein the locking device includes:
      a detent arranged on the manual brake lever and adapted to pivot around a pivoting axis, the detent having a bore;
      a locking segment connected to the bearing block;
      a spring element adapted to hold the detent into a locking position on the locking segment, the spring element comprising a torsion spring having a ring-shaped body;
      a connecting element comprising a circular-disc shaped head portion and a pin segment integral with the circular-disc shaped head portion;
      the pin segment defining a cylindrical section including a first portion directly adjacent to an underside of the head portion, and a second portion attached to the first portion and spaced from the head portion, wherein the first portion has a larger diameter than the second portion;
      wherein the spring element is located on the pin segment with the ring-shaped body flush against the underside of the head portion;
      the connecting element adapted to secure the detent on the manual brake lever, wherein the connecting element is attached to the manual brake lever with a radial rivet wherein the first portion of the pin segment is adapted to fit within the bore of the detent, and the head portion of the connecting element is adapted to fit against the protruding circular edge segment of the receptacle.

2. The operating mechanism according to claim 1, wherein the connecting element defines an axis element, and the detent is adapted to pivot relative to the axis element.

3. The operating mechanism according to claim 1, wherein the torsion spring comprises the ring-shaped basic body and first and second legs adjoined to the ring-shaped basic body.

4. The operating mechanism according to claim 3, wherein the ring-shaped basic body of the torsion spring is fitted onto the pin segment of the connecting element to form the structural unit together with the connecting element.

* * * * *